US006695343B1

(12) United States Patent
Christiansen et al.

(10) Patent No.: US 6,695,343 B1
(45) Date of Patent: Feb. 24, 2004

(54) SNAP-IN AIR BAG MODULE

(75) Inventors: Kirk W. Christiansen, Tempe, AZ (US); Paul A. Bowers, Ray, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 0 days.

(21) Appl. No.: 09/718,030

(22) Filed: Nov. 20, 2000

(51) Int. Cl.[7] .......................... B60R 21/20; B60R 21/22
(52) U.S. Cl. ..................................... 280/731; 280/728.2
(58) Field of Search ............................. 280/728.2, 731; 411/508; 24/453

(56) References Cited

U.S. PATENT DOCUMENTS

| | | | | |
|---|---|---|---|---|
| 3,727,271 A | * | 4/1973 | Znamirowski | |
| 3,897,967 A | * | 8/1975 | Barenyi | 114/219 |
| 4,739,543 A | * | 4/1988 | Harris | |
| 4,988,119 A | * | 1/1991 | Hartmeyer | 141/313 |
| 5,064,218 A | | 11/1991 | Hartmeyer | |
| 5,195,774 A | | 3/1993 | Morita | |
| 5,333,897 A | | 8/1994 | Landis et al. | |
| 5,505,483 A | * | 4/1996 | Taguchi et al. | |
| 5,556,125 A | * | 9/1996 | Ricks et al. | 24/453 |
| 5,584,501 A | * | 12/1996 | Walters | |
| 5,590,900 A | | 1/1997 | Duran et al. | |
| 5,636,858 A | | 6/1997 | Niedermann et al. | |
| 5,775,725 A | | 7/1998 | Hodac et al. | |
| 5,890,733 A | * | 4/1999 | Dillon | 280/728.2 |
| 5,931,492 A | * | 8/1999 | Mueller et al. | 280/728.2 |
| 5,947,509 A | | 9/1999 | Ricks et al. | |
| 6,428,036 B1 | * | 8/2002 | Mramor et al. | 280/728.2 |
| 6,435,546 B1 | * | 8/2002 | Scherer et al. | 200/61.55 |

FOREIGN PATENT DOCUMENTS

| | | |
|---|---|---|
| EP | 0 661 194 A1 | 5/1995 |
| EP | 0 754 603 A1 * | 1/1997 |
| JP | 09030358 A * | 2/1997 |

* cited by examiner

Primary Examiner—Paul N. Dickson
Assistant Examiner—Ruth Ilan
(74) Attorney, Agent, or Firm—Tarolli, Sundheim, Covell & Tummino, L.L.P.

(57) ABSTRACT

An apparatus comprises a vehicle steering wheel (12) including an armature (14). The armature (14) has a base portion (16), a circumferentially extending rim portion (18), and at least one spoke (20) extending between the rim portion and the base portion. The base portion (16) includes oppositely disposed first and second surfaces (22 and 24) and a plurality of openings (30) extending between the first and second surfaces. An inflatable vehicle occupant protection device (40) abuts the first surface (22). The inflatable vehicle occupant protection device (40) comprises an inflatable air bag (42) and an actuatable inflator (44) for, when actuated, inflating the air bag. The inflator (44) has a radially outwardly extending flange (60). The flange (60) includes a plurality of apertures (66). A plurality of one-piece locking members (100) secure the inflatable vehicle occupant protection device (40) to the armature (14). Each of the locking members (100) has a compressible end portion (104) that compresses radially inward to permit the end portion to pass through a respective one of the openings (66) in the flange (60) and through a respective one of the apertures (30) in the base portion (16). The end portion (104) of each of the locking members (100) includes a radially outwardly extending stop surface (116) that engages the second surface (24) of the base portion (16) to secure the inflatable vehicle occupant protection device (40) to the armature (14).

6 Claims, 2 Drawing Sheets

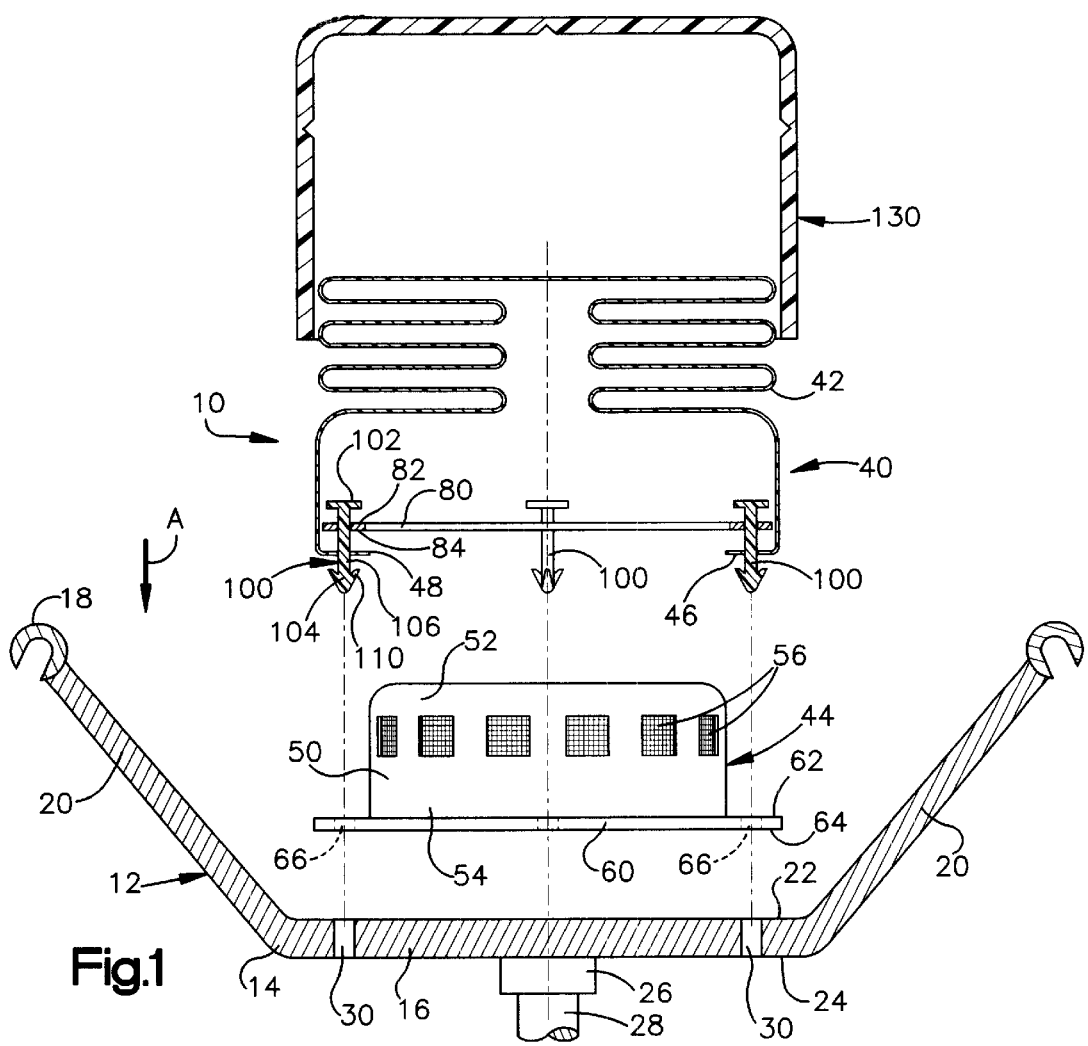
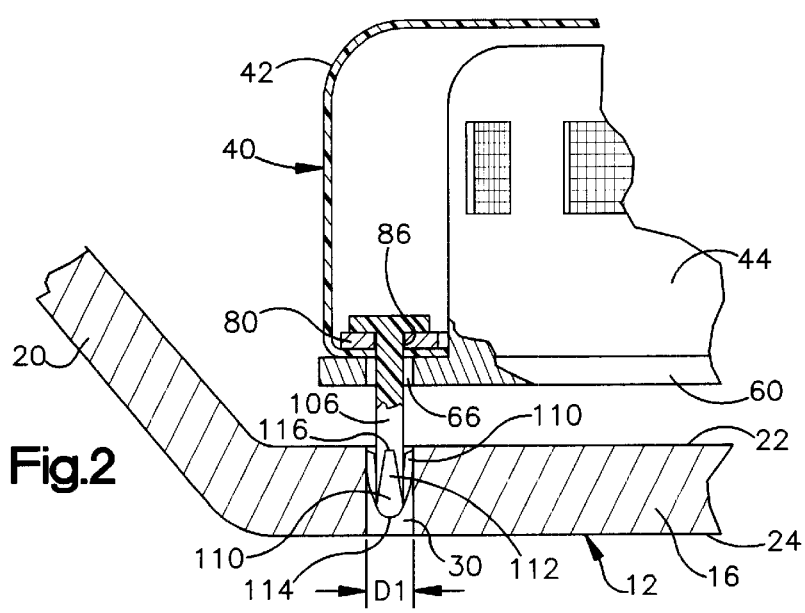

SNAP-IN AIR BAG MODULE

TECHNICAL FIELD

The present invention is directed to an inflatable vehicle occupant protection device for mounting on a vehicle steering wheel and, in particular, is directed to an air bag module that is connected to a steering wheel armature by snap-in fasteners.

BACKGROUND OF THE INVENTION

It is known to mount an inflatable vehicle occupant protection device, such as an air bag module, on a vehicle steering wheel to help protect a vehicle driver in the event of a vehicle collision. The air bag module includes an inflatable air bag and an actuatable inflator for, when actuated, inflating the air bag. Further, the air bag module typically includes an annular retainer for securing the air bag to an annular flange on the inflator. In addition, the typical air bag module has a reaction plate for securing the inflator to a base portion of the steering wheel and absorbing the forces generated by the air bag and the inflator during deployment.

The aforementioned components of the air bag module and the steering wheel are usually connected by an assortment of threaded fasteners. These threaded fasteners increase the complexity and the cost of manufacturing and assembling the air bag module. In order to reduce cost and complexity, it is known to use snap-in fasteners to connect components of an air bag module and a vehicle steering wheel.

The present invention aims to reduce the number of components used in the air bag module by employing snap-in fasteners and by eliminating certain parts of a typical air bag module, such as the reaction plate and the air bag retainer.

SUMMARY OF THE INVENTION

The present invention is an apparatus comprising a vehicle steering wheel including an armature. The armature has a base portion, a circumferentially extending rim portion, and at least one spoke extending between the rim portion and the base portion. The base portion of the armature includes oppositely disposed first and second surfaces and a plurality of openings extending between the first and second surfaces. An inflatable vehicle occupant protection device abuts the first surface of the base portion of the armature. The inflatable vehicle occupant protection device comprises an inflatable air bag and an actuatable inflator for, when actuated, inflating the air bag. The inflator has a radially outwardly extending flange. The flange includes a plurality of apertures. A plurality of one-piece locking members secure the inflatable vehicle occupant protection device to the armature. Each of the locking members has a compressible end portion that compresses radially inward to permit the end portion to pass through a respective one of the openings in the flange of the inflator and through a respective one of the apertures in the base portion of the armature. The end portion of each of the locking members includes a radially outwardly extending stop surface. Each of the locking members extends through the respective one of the openings in the flange and through the respective one of the apertures in the base portion. The stop surface on each of the locking members engages the second surface of the base portion of the armature to secure the inflatable vehicle occupant protection device to the armature.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is an exploded sectional view of an air bag module and a vehicle steering wheel constructed in accordance with the present invention;

FIG. 2 is a sectional view of a portion of the air bag module and the vehicle steering wheel of FIG. 1 illustrating a partially assembled condition;

DESCRIPTION OF PREFERRED EMBODIMENTS

Figure 3:
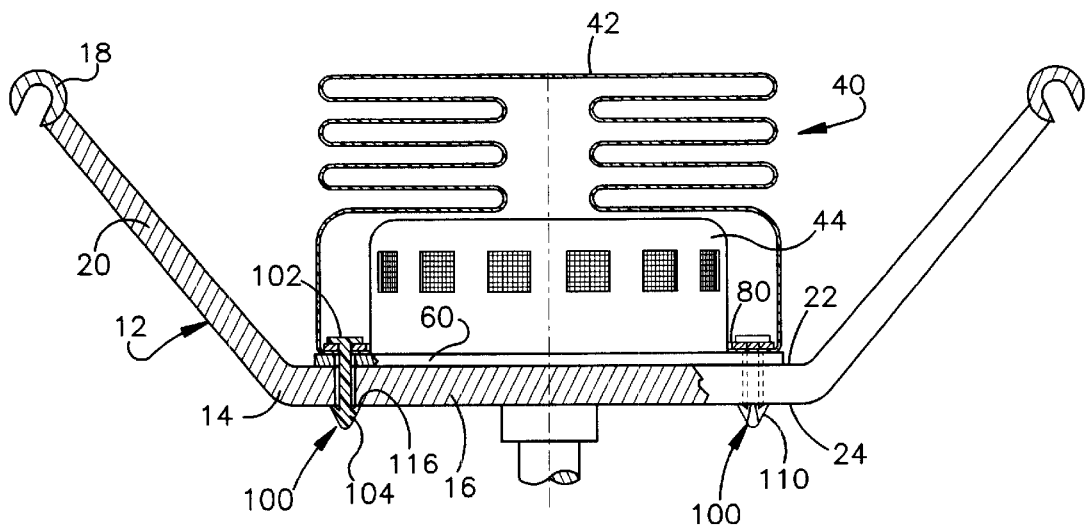
FIG. 3 is a sectional view of the air bag module and the vehicle steering wheel of FIG. 1 illustrating a fully assembled condition.

The present invention is directed to an inflatable vehicle occupant protection device for mounting on a vehicle steering wheel and, in particular, is directed to an air bag module that is connected to a steering wheel armature by snap-in fasteners. As representative of the present invention, FIG. 1 illustrates an inflatable vehicle occupant protection device 10 and a vehicle steering wheel 12.

The vehicle steering wheel 12 includes a steering wheel armature 14. The armature 14 has a base portion 16, a circumferentially extending rim portion 18, and a plurality of spokes 20 extending between the base portion and the rim portion. The base portion 16 includes oppositely disposed first and second surfaces 22 and 24. A centrally located hub 26 projects axially from the second surface 24 of the base portion 16. The hub 26 connects the steering wheel 12 to a vehicle steering shaft 28 as is known in the art.

The base portion 16 of the armature 14 further includes a circumferentially spaced plurality of openings 30. The openings 30 extend between the first and second surfaces 22 and 24 of the base portion 16 and have a diameter D1 (FIG. 2).

The inflatable vehicle occupant protection device 10 comprises a driver-side air bag module 40 (FIG. 1). The air bag module 40 includes an inflatable air bag 42 and an actuatable inflator 44 for, when actuated, providing inflation fluid to inflate the air bag. The air bag 40 has a mouth portion 46 that defines an inlet 48 into the air bag. The mouth portion 46 includes a plurality of mounting holes (not numbered) that are spaced circumferentially apart and are alignable with the plurality of openings 30 in the base portion 16 of the armature 14.

The inflator 44 has a cylindrical main body portion 50 and oppositely disposed first and second end portions 52 and 54. The first end portion 52 includes a plurality of fluid exit ports 56 for directing inflation fluid from the inflator 44 into the air bag 42. The second end portion 54 of the inflator 44 includes a radially outwardly extending flange 60. The flange 60 has oppositely disposed first and second surfaces 62 and 64. A circumferentially spaced plurality of apertures 66 extend between the first and second surfaces 62 and 64 of the flange 60. The apertures 66 have a diameter that is approximately equal to the diameter D1 of the openings 30 in the base portion 16 of the armature 14. The apertures 66 in the flange 60 are alignable with the openings 30 in the base portion 16 of the armature 14 and the mounting holes in the mouth portion 46 of the air bag 42.

The air bag module 40 further includes a ring-shaped retainer member 80 for helping to retain the mouth portion 46 of the air bag 44 on the flange 60 of the inflator 44. The retainer member 80 has oppositely disposed first and second surfaces 82 and 84. The retainer member 80 includes a circumferentially spaced plurality of openings 86 (FIG. 2) that are alignable with the mounting holes in the mouth portion 46 of the air bag 42, the apertures 66 in the flange 60 on the inflator 44, and the openings 30 in the base portion 16 of the armature 14. The openings 86 in the retainer member 80 have a diameter that is slightly smaller than the diameter D1 of the openings 30 in the base portion 16 of the armature 14.

A plurality of locking members 100 secure the air bag module 40 to the armature 14. Each of the locking members 100 has oppositely disposed first and second end portions 102 and 104 connected by a shank portion 106. The first end portion 102 of each locking member 100 comprises a cylindrical head having a diameter that is greater than the diameter of the openings 86 in the retainer member 80. The shank portion 106 of each of the locking members 100 is an elongated cylinder having a diameter that is smaller than the diameter of the openings 86 in the retainer member 80 and the diameter of the apertures 66 in the flange 60. The diameter of the shank portion 106 of each of the locking members 100 is also smaller than the diameter D1 of the openings 30 in the base portion 16 of the armature 14.

The second end portion 104 of each of the locking members 100 comprises a plurality of deflectable tabs 110 that are compressible radially inward. Each of the tabs 110 has an outer surface 112 that tapers radially inward as the tab extends axially toward a rounded tip 114 at the second end of the locking member. Each of the tabs 110 further includes a generally radially extending stop surface 116 that extends between the tapered outer surface 112 and the shank portion 106 of the locking member 100.

The rounded tip 114 of the second end portion 104 has a diameter that is smaller than the diameter of the openings 86 in the retainer member 80, the diameter of the apertures 66 in the flange 60, and the diameter D1 of the openings 30 in the base portion 16 of the armature 14. In a free, or uncompressed, condition, the tabs 110 at the second end portion 104 define a maximum diameter for the second end portion that is larger than the diameter of the openings 86 in the retainer member 80, the diameter of the apertures 66 in the flange 60, and the diameter D1 of the openings 30 in the base portion 16 of the armature 14.

To assemble the air bag module 40, the retainer member 80 is placed inside the air bag 42 so that the mouth portion 46 of the air bag abuts the second surface 84 of the retainer member. The plurality of openings 86 in the retainer member 80 are aligned with the plurality of mounting holes in the mouth portion 46 of the air bag 42. The second end portion 104 of each of the locking members 100 is then inserted through a respective one of the openings 86 in the retainer member 80 and through a respective one of the mounting holes in the mouth portion 46 of the air bag 42.

Since the maximum diameter at the second end portion 104 of each of the locking members 100 is larger than the diameter of the openings 86 in the retainer member 80, the second end portion of each locking member must be forcefully pushed, in the direction of arrow A, through one of the openings in the retainer member. This forceful pushing of each locking member 100 causes the tabs 110 at the second end portion 104 to compress radially inward in order to fit through the opening 86. Once the second end portion 104 of each locking member 100 passes through one of the openings 86, the tabs 110 snap radially outward back to their original condition. The locking members 100 are pushed in the direction of arrow A until the first end portion 102 of each locking member engages the first surface 82 of the retainer member 80. It should be understood that the locking members 100 could alternatively be press-fit into the openings 86 of the retainer member 80 ahead of time or formed in one piece with the retainer member.

Next, the retainer member 80 and the mouth portion 46 of the air bag 42 are placed over the first end portion 52 of the inflator 44 so that the fluid exit ports 56 are disposed inside the air bag. The plurality of apertures 66 in the flange 60 on the inflator 44 are aligned with the locking members 100. The second end portion 104 of each of the locking members 100 is then inserted through a respective one of the apertures 66 in the flange 60.

Since the maximum diameter at the second end portion 104 of each of the locking members 100 is larger than the diameter of the apertures 66 in the flange 60, the second end portion of each locking member must be forcefully pushed through the aligned aperture. This forceful pushing of each locking member causes the tabs 110 at the second end portion 104 to compress radially inward in order to fit through the aperture 66. Once the second end portion 104 of each locking member passes through one of the apertures 66, the tabs 110 snap radially outward back to their original condition.

The shank portions 106 of the locking members 100 are pushed through the apertures 66 in the flange 60 on the inflator 44 until the mouth portion 46 of the air bag 42 is brought into engagement with the first surface 62 of the flange. The mouth portion 46 of the air bag 42 is thus positioned between the first surface 62 of the flange 60 and the second surface 84 of the retainer member 80.

Next, the second surface 64 of the flange 60 of the inflator 44 is brought into engagement with the first surface 22 of the base portion 16 of the armature 14 and the locking members 100 are aligned with the openings 30 in the base portion. The second end portion 104 of each of the locking members 100 is then inserted through a respective one of the openings 30 in the base portion 16. Since the maximum diameter at the second end portion 104 of each of the locking members 100 is larger than the diameter D1 of the openings 30 in the base portion 16, the second end portion of each locking member must be forcefully pushed through one of the openings. This forceful pushing of each locking member 100 causes the tabs 110 at the second end portion 104 to compress radially inward in order to fit into the opening 30, as is shown in FIG. 2. Once the second end portion 104 of each locking member 100 passes through one of the openings 30, the tabs 110 snap radially outward back to their original condition.

As illustrated in FIG. 3, when the tabs 110 at the second end portion 104 of each locking member 100 snap radially outward, the stop surface 116 of each tab 110 engages the second surface 24 of the base portion 16 of the armature 14. With the stop surface 116 of each of the tabs 110 engaged with the second surface 24 of the base portion 16, the locking members 100 are placed in tension due to the length of the locking members in comparison to the combined thicknesses of the elements through which the locking members project. The tension in the locking members 100 tightly secures the air bag module 40 to the armature 14.

Finally, as is known in the art, a cover 130 encloses the air bag module 40. The cover 130 attaches to the steering wheel 12 in a manner not shown.

By using the snap-in locking members 100 to secure the retainer member 80, the air bag 42, and the inflator 44 to the armature 14, the present invention reduces the number of fasteners used in the assembly of the air bag module 10 and the steering wheel 12. Further, the present invention eliminates a conventional reaction plate by utilizing the base portion 16 of the armature 14 as the reaction member for absorbing the forces generated during deployment of the air bag 42.

Figure 4:
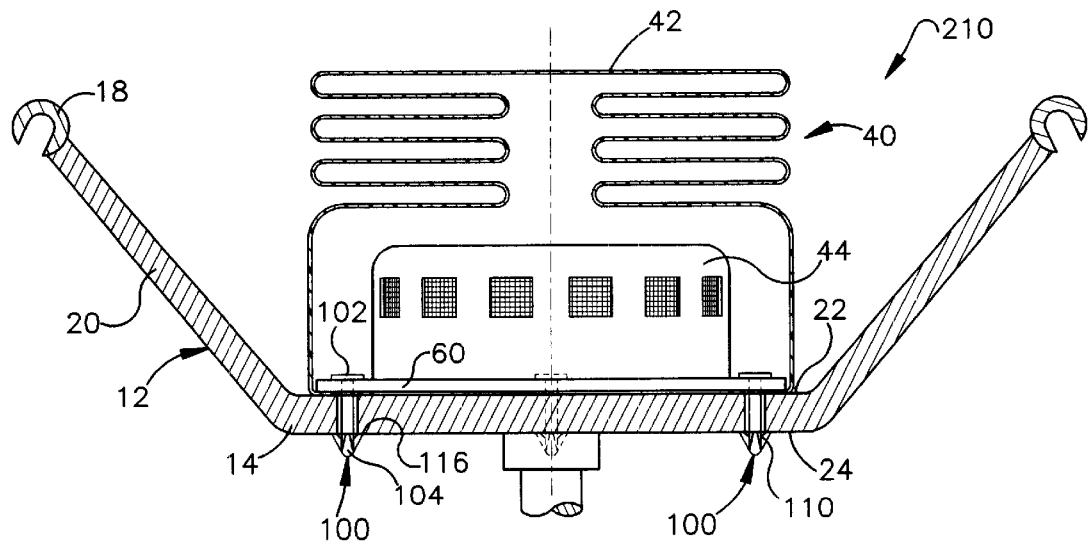
FIG. 4 is an assembled sectional view of an air bag module and a vehicle steering wheel constructed in accordance with a second embodiment of the present invention.

FIG. 4 illustrates an air bag module 210 constructed in accordance with a second embodiment of the present invention. In the second embodiment of FIG. 4, reference numbers that are the same as those used in the first embodiment of FIGS. 1–3 are used to designate parts that are similar to parts in the first embodiment.

According to the second embodiment, the air bag module 210 does not include a retainer member like the retainer member 80 of the first embodiment. Rather, the first end portion 102 of each of the locking members 100 abuts the first surface 62 of the flange 60. The mouth portion 46 of the air bag 42 is positioned between the second surface 64 of the flange 60 and the first surface 22 of the base portion 16 of the armature 14. The locking members 100 thus extend through the apertures 66 in the flange 60, the mounting holes in the air bag 42, and the openings 30 in the base portion 16 to secure the air bag module 10 to the armature 12.

By eliminating the retainer member 80 of the first embodiment and using the snap-in locking members 100 to secure the air bag 42 and the inflator 44 to the armature 12, the present invention according to the second embodiment further reduces the number of parts used in the assembly of the air bag module 210 and the steering wheel 12.

From the above description of the invention, those skilled in the art will perceive improvements, changes and modifications. Such improvements, changes and modifications within the skill of the art are intended to be covered by the appended claims.

We claim:

1. An apparatus comprising:
   a steering wheel armature including a base, a circumferentially extending rim, and spokes extending from said base to said rim;
   a vehicle occupant protection device comprising an inflatable air bag, an inflator, and air bag retainer; and
   a plurality of one piece snap acting fasteners for securing said air bag retainer, said inflatable air bag, said inflator, and said steering wheel armature together as a unit,
   said snap acting fasteners securing said vehicle occupant protection device to said base of said steering wheel armature; and
   said snap acting fasteners being the only fasteners in said unit comprising said armature and said vehicle occupant protection device.

2. An apparatus as defined in claim 1 wherein said inflator has a flange projecting from said inflator, said flange having an upper surface and a lower surface, said lower surface of said flange engaging said base of said steering wheel armature and said inflatable air bag engaging said upper surface of said flange,
   said snap acting fasteners extending through aligned openings in said air bag retainer, said air bag, said flange, and said base of said steering wheel armature.

3. An apparatus as defined in claim 2 wherein said snap acting fasteners have a head on one end, said head of each of said snap acting fasteners engaging said air bag retainer.

4. An apparatus comprising:
   a steering wheel armature including a base, a circumferentially extending rim, and spokes extending from said base to said rim;
   a vehicle occupant protection device comprising an inflatable air bag and an inflator; and
   a plurality of one piece snap acting fasteners for securing said inflatable air bag, said inflator, and said steering wheel armature together as a unit,
   said snap acting fasteners securing said vehicle occupant protection device to said base of said steering wheel armature,
   said snap acting fasteners being the only fasteners in said unit comprising said steering wheel armature and said vehicle occupant protection device.

5. An apparatus as defined in claim 4 wherein said inflator has a flange projecting from said inflator, said flange having an upper surface and a lower surface, said lower surface of said flange engaging said inflatable air bag and said inflatable air bag engaging said base of said steering wheel armature, said snap acting fasteners extending through aligned openings in said inflatable air bag, said flange, and said base of said steering wheel armature.

6. An apparatus as defined in claim 5 wherein said snap acting fasteners have a head on one end, said head engaging said upper surface of said flange.

* * * * *